United States Patent
Sakai

(10) Patent No.: US 12,126,288 B2
(45) Date of Patent: Oct. 22, 2024

(54) SELECTION DEVICE AND SELECTION METHOD

(71) Applicant: FANUC CORPORATION, Yamanashi (JP)

(72) Inventor: Koujirou Sakai, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 210 days.

(21) Appl. No.: 17/800,948

(22) PCT Filed: Feb. 22, 2021

(86) PCT No.: PCT/JP2021/006634
§ 371 (c)(1),
(2) Date: Aug. 19, 2022

(87) PCT Pub. No.: WO2021/172273
PCT Pub. Date: Sep. 2, 2021

(65) Prior Publication Data
US 2023/0076521 A1 Mar. 9, 2023

(30) Foreign Application Priority Data
Feb. 27, 2020 (JP) .................. 2020-031132

(51) Int. Cl.
*H02P 6/14* (2016.01)
*H02K 11/33* (2016.01)
*H02P 27/06* (2006.01)

(52) U.S. Cl.
CPC .............. *H02P 27/06* (2013.01); *H02K 11/33* (2016.01); *H02K 2213/03* (2013.01)

(58) Field of Classification Search
CPC ..... H02P 27/06; H02P 29/00; G05B 19/0428; G05B 2219/25257; H02K 11/33; H02K 2213/03
See application file for complete search history.

(56) References Cited

U.S. PATENT DOCUMENTS

| | | | |
|---|---|---|---|
| 5,943,245 A | 8/1999 | Melfi et al. | |
| 2019/0095966 A1* | 3/2019 | Chen | G06Q 30/06 |

FOREIGN PATENT DOCUMENTS

| | | |
|---|---|---|
| JP | 2009204600 A | 9/2009 |
| JP | 2011008642 A | 1/2011 |

(Continued)

OTHER PUBLICATIONS

International Search Report issued by the Japanese Patent Office acting as the International Searching Authority in relation to International Application No. PCT/JP2021/006634 dated Apr. 20, 2021 (4 pages) along with English language translation (3 pages).

(Continued)

*Primary Examiner* — Karen Masih
(74) *Attorney, Agent, or Firm* — Robert P. Michal, Esq.; Carter, DeLuca & Farrell LLP

(57) ABSTRACT

Provided are a selection device and a selection method in which it is easy for an operator to select a motor and an amplifier while taking an auxiliary function and a compliance standard into consideration. Provided is a selection device which selects a motor and an amplifier and which comprises: a storage unit that stores the performance of each motor among a plurality of motors and, for each of the plurality of motors and a plurality of amplifiers stores function and standards information indicating a corresponding auxiliary function and compliance standard, as well as an amplifier corresponding to the performance of the motor; an input unit into which an operator inputs selection information; a motor selection unit that selects a motor fulfilling a condition; an amplifier selection unit that selects an amplifier that can drive the motor fulfilling the condition; a function and standards information acquisition unit that acquires the function and standards information corresponding to the selected motor and the selected amplifier; and a display unit that displays the selected motor, the selected (Continued)

amplifier, and the acquired function and standards information.

11 Claims, 6 Drawing Sheets

(56) References Cited

FOREIGN PATENT DOCUMENTS

| | | | |
|---|---|---|---|
| JP | 2019057963 A | 4/2019 | |
| JP | 2019058046 A | 4/2019 | |
| WO | 2019186748 A1 | 10/2019 | |

OTHER PUBLICATIONS

Written Opinion of the International Searching Authority issued by the Japanese Patent Office acting as the International Searching Authority in relation to International Application No. PCT/JP2021/006634 dated Apr. 20, 2021 (4 pages).

Sew Eurodrive, Dr..71~315, DRN80~315, [online], 2016, pp. 22-28, [retrived on Apr. 1, 2021] Internet<URL: http:/douwnload.sew-eurodrive.com/download/pdf/22760547.pdf, pp. 22-28, (instruction manual, three-phase AC motor) along with English language translation.

* cited by examiner

| MOTOR IDENTIFICATION INFORMATION | CONTINUOUS RATED CURRENT [A] |
|---|---|
| MOTOR A | 20 |
| MOTOR B | 20 |
| MOTOR C | 40 |
| MOTOR D | 40 |
| MOTOR E | 80 |
| MOTOR F | 80 |

| MOTOR IDENTIFICATION INFORMATION | CONTINUOUS RATED CURRENT [A] | CONTINUOUS TORQUE [Nm] | MAXIMUM TORQUE [Nm] | MAXIMUM SPEED [rpm] |
|---|---|---|---|---|
| MOTOR A | 20 | 1 | 5.3 | 5000 |
| MOTOR B | 20 | 2 | 8.3 | 5000 |
| MOTOR C | 40 | 4 | 15 | 5000 |
| MOTOR D | 40 | 8 | 29 | 3000 |
| MOTOR E | 80 | 8 | 32 | 4000 |
| MOTOR F | 80 | 12 | 35 | 4000 |

FIG. 4

| AMPLIFIER IDENTIFICATION INFORMATION | CONTINUOUS RATED CURRENT (CONTROL AXIS 1) [A] | CONTINUOUS RATED CURRENT (CONTROL AXIS 2) [A] |
|---|---|---|
| AMPLIFIER A | 20 | — |
| AMPLIFIER B | 20 | 20 |
| AMPLIFIER C | 40 | — |
| AMPLIFIER D | 40 | 40 |
| AMPLIFIER E | 80 | — |
| AMPLIFIER F | 80 | 80 |

FIG. 5

| IDENTIFICATION INFORMATION | FUNCTION AND STANDARDS INFORMATION ||
|---|---|---|
| | AUXILIARY FUNCTION | COMPLIANCE STANDARD |
| MOTOR A | — | JIS |
| MOTOR B | BRAKE CHECK | JIS |
| MOTOR C | — | ⋮ |
| MOTOR D | BRAKE CHECK | ⋮ |
| MOTOR E | — | ⋮ |
| MOTOR F | BRAKE CHECK | ⋮ |
| ⋮ | ⋮ | ⋮ |
| AMPLIFIER A | MOTOR INSULATION RESISTANCE MEASUREMENT | JIS |
| AMPLIFIER B | — | JIS |
| AMPLIFIER C | MOTOR INSULATION RESISTANCE MEASUREMENT<br><br>ELECTROLYTIC CAPACITOR CAPACITANCE CHECK | ⋮ |
| AMPLIFIER D | — | ⋮ |
| AMPLIFIER E | — | ⋮ |
| AMPLIFIER F | MOTOR INSULATION RESISTANCE MEASUREMENT<br><br>ELECTROLYTIC CAPACITOR CAPACITANCE CHECK | ⋮ |

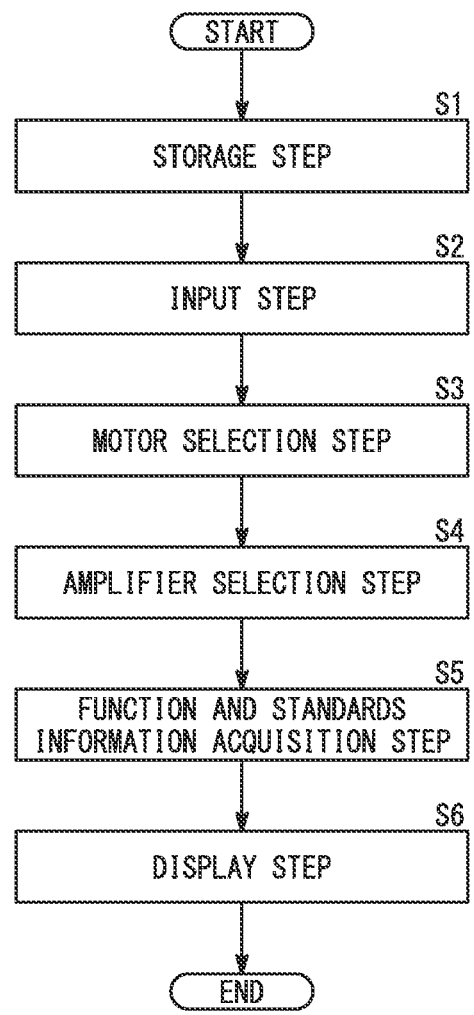

SELECTION DEVICE AND SELECTION METHOD

CROSS-REFERENCE TO RELATED APPLICATIONS

This application is a national phase entry under 35 U.S.C. 371 of PCT International Application No. PCT/JP2021/006634 filed Feb. 22, 2021, which claims priority to Japanese Patent Application No. 2020-031132, filed Feb. 27, 2020, the disclosure of each of these applications is expressly incorporated herein by reference in their entirety.

TECHNICAL FIELD

The present invention relates to a selection device. In particular, the present invention relates to a selection device and a selection method for selecting a motor and an amplifier.

BACKGROUND ART

A selection device has been proposed, which selects a motor having a performance desired by an operator, and an amplifier that is capable of driving the motor. An example of such a selection device is disclosed, for example, in JP 2019-058046 A.

SUMMARY OF THE INVENTION

Certain motors and amplifiers exist which are equipped with auxiliary functions such as failure detection, whereas other ones are not equipped with such functions. Further, certain motors and amplifiers exist that are compliant with standards, whereas other ones do not comply with such standards. However, in existing selection devices, the motors and amplifiers have not been selected on the basis of information concerning auxiliary functions and standards. Further, in such existing selection devices, information concerning auxiliary functions and compliance standards of the selected motors and amplifiers has not been provided to the operator.

Due to the facts mentioned above, it has not been easy for the operator to select an amplifier which is capable of driving a motor having a desired performance while taking into consideration an auxiliary function and a compliance standard.

Thus, the present invention has the object of providing a selection device and a selection method, in which it is easy for an operator to select a motor and an amplifier while taking into consideration an auxiliary function and a compliance standard.

According to one aspect of the present invention, provided is a selection device that, when an operator inputs selection information including conditions related to performance of a motor, selects the motor and an amplifier based on the selection information, the selection device comprising a storage unit configured to store the performance of the motor for each of a plurality of the motors, and store, for each of the plurality of motors and each of a plurality of the amplifiers, function and standards information indicative of at least one of an auxiliary function or a compliance standard corresponding to each of the motors and each of the amplifiers, and the amplifier corresponding to the performance of the motor, an input unit with which the operator inputs the selection information, a motor selection unit configured to, by referring to the storage unit, select the motor satisfying the conditions, an amplifier selection unit configured to, by referring to the storage unit, select the amplifier configured to drive the motor satisfying the conditions, a function and standards information acquisition unit configured to, by referring to the storage unit, acquire the function and standards information corresponding to the selected motor and the selected amplifier, and a display unit configured to display the selected motor, the selected amplifier, and the acquired function and standards information.

According to another aspect of the present invention, provided is a selection device that, when an operator inputs selection information, selects a motor and an amplifier based on the selection information, the selection information including conditions related to performance of the motor, and function and standards information indicative of at least one of an auxiliary function or a compliance standard of the motor and the amplifier, the selection device comprising a storage unit configured to store the performance of the motor for each of a plurality of the motors, and store, for each of the plurality of motors and each of a plurality of the amplifiers, the function and standards information corresponding to each of the motors and each of the amplifiers, and the amplifier corresponding to the performance of the motor, an input unit with which the operator inputs the selection information, a motor selection unit configured to, by referring to the storage unit, select the motor satisfying the selection information, an amplifier selection unit configured to, by referring to the storage unit, select the amplifier that is configured to drive the motor satisfying the selection information and that corresponds to the function and standards information, and a display unit configured to display the selected motor and the selected amplifier.

According to still another aspect of the present invention, provided is a selection method for selecting a motor and an amplifier based on selection information including conditions related to performance of the motor, the selection method comprising a storage step of storing the performance of the motor for each of a plurality of the motors, and storing, for each of the plurality of motors and each of a plurality of the amplifiers, function and standards information indicative of at least one of an auxiliary function or a compliance standard corresponding to each of the motors and each of the amplifiers, and the amplifier corresponding to the performance of the motor, an input step of inputting the selection information by an operator, a motor selection step of selecting, based on the information stored in the storage step, the motor satisfying the conditions, an amplifier selection step of selecting, based on the information stored in the storage step, the amplifier configured to drive the motor satisfying the conditions, a function and standards information acquisition step of acquiring, based on the information stored in the storage step, the function and standards information corresponding to the selected motor and the selected amplifier, and a display step of displaying the selected motor, the selected amplifier, and the acquired function and standards information.

According to the aspects of the present invention, a selection device and a selection method are provided, in which it is easy for an operator to select a motor and an amplifier while taking into consideration an auxiliary function and a compliance standard.

BRIEF DESCRIPTION OF THE DRAWINGS

FIG. 3A is a table showing an example of a first configuration of a first table;

FIG. 3B is a table showing an example of a second configuration of the first table;

FIG. 4 is a table showing an example of a configuration of a second table;

FIG. 5 is a table showing an example of a configuration of a third table; and

FIG. 6 is a flowchart illustrating a process flow of a selection method according to the embodiment.

DESCRIPTION OF THE INVENTION

A preferred embodiment in relation to a selection device and a selection method according to the present invention will be presented and described in detail below with reference to the accompanying drawings.

Embodiment

Figure 1:
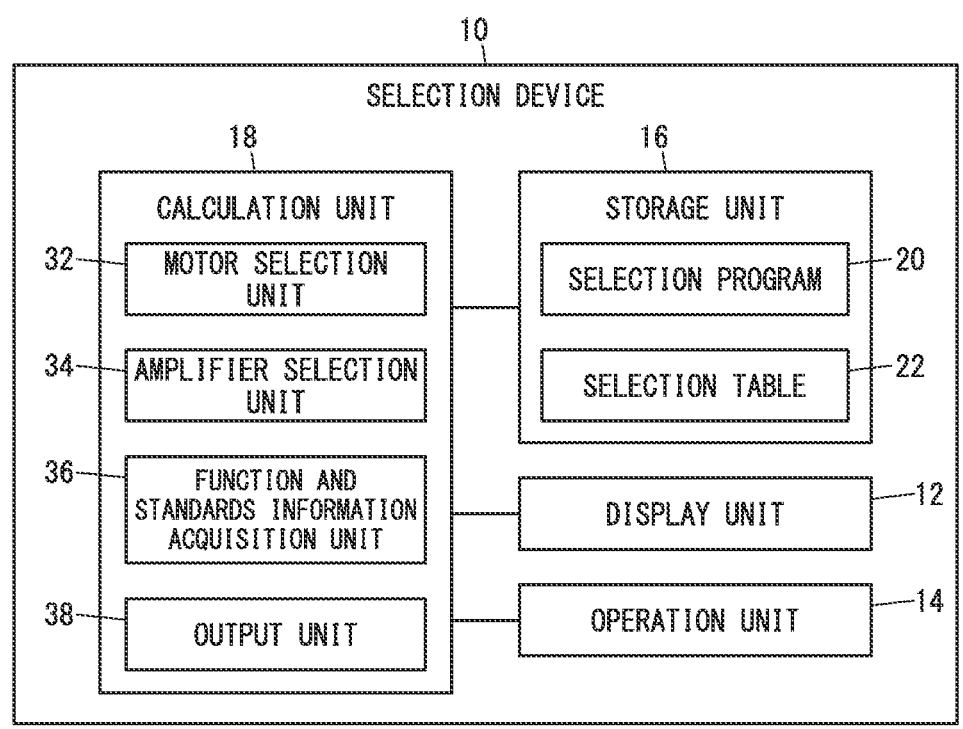
FIG. 1 is a schematic configuration diagram of a selection device according to an embodiment of the present invention.

FIG. 1 is a schematic configuration diagram of a selection device 10 according to an embodiment.

The selection device 10 is an electronic device (a computer) which is provided in order to easily construct a servo mechanism (a servo system) including a servo motor and a servo amplifier. The selection device 10 according to the present embodiment is equipped with a display unit 12, an operation unit (input unit) 14, a storage unit 16, and a calculation unit 18. Hereinafter, descriptions will be given sequentially concerning these configurations. Moreover, hereinafter, the term "servo motor" may also simply be referred to as a "motor", and the term "servo amplifier" may also simply be referred to as an "amplifier".

The display unit 12 is a display device having a screen for displaying information. Although the screen of the display unit 12 is not limited to this feature, for example, the screen may be a liquid crystal screen. An input screen provided for inputting later-described selection information, and selection results are displayed on the display unit 12.

The operation unit 14 is provided in order to allow an operator to input information to the selection device 10, and is constituted, for example, by a keyboard, a mouse, or a touch panel that is attached to the screen of the display unit 12. By operating the operation unit 14, the operator is capable of inputting the selection information to the selection device 10.

The storage unit 16 serves to store information. The storage unit 16 is constituted by hardware such as, for example, a RAM (Random Access Memory) and a ROM (Read Only Memory). The storage unit 16 stores a predetermined selection program 20 and a predetermined selection table 22.

The selection program 20 is a program in which there is defined a motor and amplifier selection method (hereinafter, simply referred to as a "selection method") that facilitates the operator selecting an amplifier while taking into consideration an auxiliary function and a compliance standard of the amplifier. The details of such a selection method will be described later.

Figure 2:
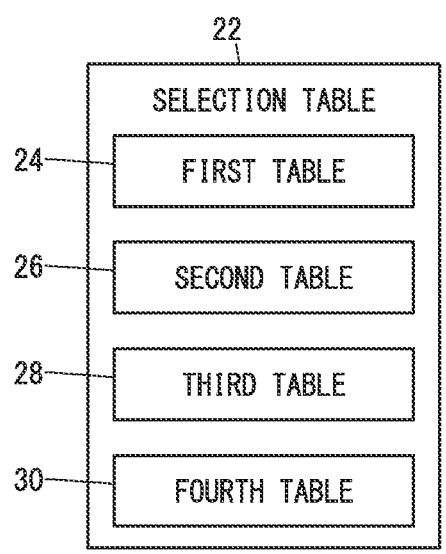
FIG. 2 is a configuration diagram of a selection table.

FIG. 2 is a configuration diagram of the selection table 22.

The selection table 22 is a table in which there is specified necessary information when the selection method is executed. In this instance, the selection table 22 according to the present embodiment includes a first table 24, a second table 26, a third table 28, and a fourth table 30, which will be described hereinafter.

The first table 24 is a table in which a plurality of motors, and information indicative of the performance of each of the plurality of motors, are specified. The information indicative of the performance of the motors, for example, is a value of a continuous rated current of the motors. However, the information indicative the performance of the motors is not necessarily limited to this feature, and may be a value of a continuous torque (a rated torque), a maximum torque, or a maximum speed of the motors.

FIG. 3A is a table showing an example of a first configuration of the first table 24.

In FIG. 3A, the first table 24 is exemplified in which values of the continuous rated current are specified as the information indicative of the performance of the motors. In the configuration of the first table 24, motor identification information indicative of names or control numbers of the plurality of motors A to F are specified in the left column, and values of the continuous rated current for the motors A to F are specified in the right column. According to FIG. 3A, for example, it can be understood that the continuous rated current (in amperes) of the motor A and the motor B is 20 A, and the continuous rated current of the motor C and the motor D is 40 A.

FIG. 3B is a table showing an example of a second configuration of the first table 24.

For example, as illustrated in FIG. 3B, the configuration of the first table 24 may be such that a plurality of items of information indicative of the performance of one of the motors are specified for the one motor. According to FIG. 3B, for example, concerning the motor C, it can be understood that the continuous rated current is 40 A, the continuous torque is 4 Nm (Newton meters), the maximum torque is 15 Nm, and the maximum speed is 5000 rpm (revolutions per minute).

Next, a description will be given concerning the second table 26. The second table 26 is a table in which a plurality of amplifiers, and information indicative of the performance of the motors that can be driven by the amplifiers, are specified in association with each other. For example, it is assumed that values of the continuous rated current are specified in the first table 24 as information indicative of the performance of the motors. In this case, the values of the continuous rated current are specified in the second table 26 as information indicative of the performance of the motors that can be driven.

FIG. 4 is a table showing an example of a configuration of the second table 26.

In FIG. 4, the second table 26 is exemplified in which values of the continuous rated current are specified as the information indicative of the performance of the motors that can be driven. In the configuration of the second table 26, amplifier identification information indicative of names or control numbers of the amplifiers A to F are specified in the left column, and values of the continuous rated current for the amplifiers A to F are specified in the right column.

According to FIG. 4, for example, concerning a single axis amplifier A, it can be understood that the continuous rated current that is capable of being supplied is 20 A. Further, for example, concerning a multi-axis amplifier B that is capable of driving two motors simultaneously, it can be understood that the continuous rated current of both of the two axes is 20 A.

Next, a description will be given concerning the third table 28. The third table 28 is a table in which a plurality of motors and a plurality of amplifiers, and function and standards information for the motors and the amplifiers, are specified.

In this instance, the term "function and standards information" will be described. The function and standards information is information indicative of at least one of an auxiliary function or a compliance standard of the motor and the amplifier. The auxiliary function is a so-called optional function, and is a general term for functions for the sake of convenience of the operator who uses an amplifier.

As the auxiliary functions, although not all of such functions are listed in the present embodiment, failure detection, predictive maintenance, a power saving function, high performance, and a safety function are cited as some typical examples thereof. The failure detection function is further subdivided into a ground fault current detection function, a fan motor rotation detection function, a brake check function, a temperature monitoring function, and the like. The predictive maintenance function is further subdivided into an operating time monitoring function, a motor insulation resistance measurement function, a check function of the capacitance of an electrolytic capacitor, and the like. Further, the safety function is further subdivided into a mechanical brake operation function, a double monitoring function of an electric signal, and the like.

The high performance referred to in the present embodiment is a general term for functions related to ease of use, increased motor output, and influence on the environment. The high performance is further subdivided into a wiring saving function, a harmonic outflow current countermeasure function, a DC link voltage boosting function, and a frequency setting function in a so-called PWM (Pulse Width Modulation) control.

Further, the compliance standard is a standard with which the motors and the amplifiers are compliant. The term "standard" in this instance is an internationally established standard, or a standard established for each of countries or regions. As representative examples thereof, the standards set by the International Electrotechnical Commission (IEC) and the Japanese Industrial Standards (JIS standards) may be cited.

FIG. 5 is a table showing an example of a configuration of the third table 28.

In the configuration of the third table 28 illustrated in FIG. 5, identification information (motor identification information and amplifier identification information) is specified in the left column, and information indicative of the auxiliary functions and the compliance standards, which are included in the function and standards information, for the motors A to F and the amplifiers A to F is specified in the right column. According to the third table 28, for example, it can be understood that the motor B is equipped with a "brake check" and the amplifier A is equipped with a "motor insulation resistance measurement" as the auxiliary function thereof, and the motor A and the amplifier B do not have an auxiliary function. Further, it can be understood that both the amplifier A and the amplifier B are compliant with the "JIS standard".

Next, a description will be given concerning the fourth table 30. The fourth table 30 is a table in which the function and standards information, and text and drawings for describing the function and standards information (hereinafter, simply referred to as "explanatory text and the like"), are specified in association with each other.

The fourth table 30 is, for example, a table which has a left column and a right column in the same manner as in the third table 28, and in which names of the function and standards information are specified in the left column, and explanatory text and the like corresponding to the function and standards information are specified in the right column. The explanatory text and the like, for example, are simple or detailed descriptions indicating how to use the auxiliary functions indicated by the function and standards information, or the names of countries that have ratified the standards.

The examples of the configurations of the selection table 22 are as described above. It should be noted that the configurations of the selection table 22 are not necessarily limited to those illustrated in FIGS. 2 to 5, as long as a corresponding relationship between the motors and the performance thereof, a corresponding relationship between the performance of the motors and the amplifiers, and a corresponding relationship between the motors and the amplifiers and the function and standards information thereof, can be referred to.

Returning to FIG. 1, a description will be given next concerning the calculation unit 18. The calculation unit 18 processes information by carrying out computations. The calculation unit 18 is constituted by hardware, for example, such as a CPU (Central Processing Unit) and a GPU (Graphics Processing Unit).

Further, the calculation unit 18 according to the present embodiment is equipped with a motor selection unit 32, an amplifier selection unit 34, a function and standards information acquisition unit 36, and an output unit 38. These respective units can be realized by the calculation unit 18 reading in and executing the above-described selection program 20.

When the operator inputs the selection information to the selection device 10 (the calculation unit 18) via the operation unit 14, the motor selection unit 32 selects a motor on the basis of the input selection information, by referring to the storage unit 16.

In this instance, the term "selection information" will be described. The selection information is information that includes at least a condition related to the performance of the motors. The condition related to the performance of the motors is a value, or alternatively, a range of values specified for the aforementioned continuous rated current or the like.

By referring to the first table 24 of the storage unit 16, the motor selection unit 32 is capable of easily selecting a motor that satisfies the conditions of the selection information. In this instance, in the case that a plurality of motors are found that satisfy the conditions, the motor selection unit 32 selects (lists) all of the plurality of motors that satisfy the conditions.

When the operator inputs the selection information to the selection device 10 (the calculation unit 18) via the operation unit 14, the amplifier selection unit 34 selects an amplifier that is capable of driving the motor that satisfies the conditions of the input selection information, by referring to the storage unit 16.

By referring to the second table 26 of the storage unit 16, the amplifier selection unit 34 is capable of easily selecting an amplifier that is capable of driving the motor that satisfies the conditions of the selection information. In this instance, in the case that a plurality of amplifiers are found which are capable of driving the motor satisfying the conditions, the amplifier selection unit 34 selects (lists) all of the plurality of amplifiers that have been found.

When a motor and an amplifier are selected, the function and standards information acquisition unit 36, by referring to the storage unit 16, acquires the function and standards information corresponding to the selected motor and the selected amplifier.

By referring to the third table 28 of the storage unit 16, the function and standards information acquisition unit 36 is capable of easily acquiring the function and standards information corresponding to the selected motor and the selected amplifier. In this instance, in the case that a plurality of motors are selected, the function and standards information acquisition unit 36 acquires the function and standards information for each of the plurality of selected motors. Similarly, in the case that a plurality of amplifiers are selected, the function and standards information acquisition unit 36 acquires the function and standards information for each of the plurality of selected amplifiers. Further, in the case that the selected motor and the selected amplifier correspond to a plurality of auxiliary functions or compliance standards, the function and standards information acquisition unit 36 acquires all of the plurality of auxiliary functions or compliance standards corresponding to the selected motor and the selected amplifier. Furthermore, in the case that the function and standards information acquisition unit 36 is capable of acquiring the explanatory text and the like corresponding to the function and standards information by referring to the fourth table 30, then the function and standards information acquisition unit 36 also acquires the explanatory text and the like.

The output unit 38 outputs, to the display unit 12, the motor (or the list of motors) selected by the motor selection unit 32, the amplifier (or the list of amplifiers) selected by the amplifier selection unit 34, and the function and standards information as well as the explanatory text and the like acquired by the function and standards information acquisition unit 36, as selection results.

The above is an example of the configuration of the selection device 10 according to the present embodiment. Next, a description will be given concerning the selection method which is executed by the selection device 10 described above.

FIG. 6 is a flowchart illustrating a process flow of the selection method according to the embodiment.

As discussed previously, the selection method according to the present embodiment is a selection method for selecting a motor and an amplifier that is capable of driving the motor on the basis of selection information including conditions related to the performance of the motor. As illustrated in FIG. 6, the selection method includes a storage step (S1), an input step (S2), a motor selection step (S3), an amplifier selection step (S4), a function and standards information acquisition step (S5), and a display step (S6).

The storage step is a step of storing a motor performance for each of a plurality of motors, and storing, for each of the plurality of motors and each of a plurality of amplifiers, corresponding function and standards information, and an amplifier corresponding to the motor performance. Moreover, in the storage step, the explanatory text and the like for describing the function and standards information may further be stored. According to the present embodiment, these pieces of information are stored in the storage unit 16 as information constituting the selection table 22.

The input step is a step in which the operator inputs the selection information. This inputting operation is performed on the selection device 10 (the calculation unit 18) via the operation unit 14. As discussed previously, the selection information includes conditions concerning the performance of the motors, the conditions being specified by the operator.

Hereinafter, as an example, the description will be continued assuming that the operator has specified "a continuous rated current of 20 A" as a condition of the selection information.

The motor selection step is a step of selecting, on the basis of the information stored in the storage step, a motor that satisfies the conditions of the selection information that has been input in the input step. The motor selection step is executed by the motor selection unit 32. The motor selection unit 32 easily selects the motor by referring to the first table 24.

For example, it is assumed that the information specified in the first table 24 of the selection table 22 is as shown in FIG. 3A. In this case, the motor selection unit 32 selects the motor A and the motor B, which are motors that satisfy the input condition of having "a continuous rated current of 20 A".

The amplifier selection step is a step of selecting, on the basis of the information stored in the storage step, an amplifier which is capable of driving the motor that satisfies the conditions of the selection information that has been input in the input step. The amplifier selection step is executed by the amplifier selection unit 34. The amplifier selection unit 34 easily selects the amplifier by referring to the second table 26.

For example, it is assumed that the information specified in the second table 26 of the selection table 22 is as shown in FIG. 4. In this case, the amplifier selection unit 34 selects the amplifier A and the amplifier B which are capable of driving the motors (the motor A and the motor B) that satisfy the input condition of having "a continuous rated current of 20 A".

Moreover, although in the flowchart illustrated in FIG. 6, the amplifier selection step is initiated after the motor selection step, the amplifier selection step may be performed before or in parallel with the motor selection step.

The function and standards information acquisition step is a step of acquiring, on the basis of the information stored in the storage step, the function and standards information corresponding to the selected motor and the selected amplifier. The function and standards information acquisition step is executed by the function and standards information acquisition unit 36. The function and standards information acquisition unit 36 is capable of easily acquiring the function and standards information by referring to the third table 28.

For example, it is assumed that the information specified in the third table 28 of the selection table 22 is as shown in FIG. 5. In this case, for the motor A that has been selected in the motor selection step, the function and standards information acquisition unit 36 acquires the items of "auxiliary function: —(none)" and "compliance standard: JIS standard". Similarly, for the motor B that has been selected in the motor selection step, the items of "auxiliary function: brake check" and "compliance standard: JIS standard" are acquired. Further, for the amplifier A that has been selected in the amplifier selection step, the items of "auxiliary function: motor insulation resistance measurement function" and "compliance standard: JIS standard" are acquired. Similarly, for the amplifier B that has been selected in the amplifier selection step, the items of "auxiliary function:—(none)" and "compliance standard: JIS standard" are acquired.

Further, in the present step, in the case that a corresponding relationship between the function and standards information and the explanatory text and the like for describing the function and standards information is stored in the storage step, and if the explanatory text and the like for describing the function and standards information can be acquired on the basis of the corresponding relationship, the explanatory text and the like are further acquired.

Moreover, in the present step, in the case that the function and standards information includes only one of the auxiliary function or the compliance standard, it is acceptable if only one of such items is acquired.

Further, the present step may be a step of, in the case that the function and standards information includes both the auxiliary function and the compliance standard, acquiring only one of the auxiliary function or the compliance standard. At this time, the operator may be made to select in advance which one of the auxiliary function or the compliance standard is to be acquired in this step.

The display step is a step of displaying the motor selected in the motor selection step, the amplifier selected in the amplifier selection step, and the function and standards information and the explanatory text and the like acquired in the function and standards information acquisition step. The present step is executed by the output unit 38, and the selected motor, the selected amplifier, and the acquired function and standards information along with the explanatory text and the like are displayed on the display unit 12.

By the display step being executed, the operator is capable of easily grasping a motor having a desired performance, an amplifier that is capable of driving the motor, and the function and standards information for the motor and the amplifier. In the case of there being a plurality of motors or a plurality of amplifiers that are displayed, the operator can select a motor and an amplifier to be used while referring to the displayed function and standards information.

Further, in the display step, in the case that the explanatory text and the like have been acquired in the function and standards information acquisition step, the explanatory text and the like are further displayed. In accordance with this feature, for example, even if the operator does not know how to use the auxiliary functions or does not know the outline of the standards, the operator can easily grasp the content thereof.

The above is an example of the configuration of the selection method executed by the selection device 10 according to the present embodiment. According to the present embodiment, the selection device 10 and the selection method are provided, in which it is easy for the operator to select a motor and an amplifier while taking into consideration an auxiliary function and a compliance standard.

[Modification]

The embodiment has been described above as one example of the present invention. It goes without saying that various modifications or improvements are capable of being added to the above-described embodiment. Further, it is clear from the scope of the claims that other modes to which such modifications or improvements have been added can be included within the technical scope of the present invention.

(Exemplary Modification 1)

The selection information may further include the function and standards information. In that case, the motor selection unit 32 may select a motor that satisfies the selection information, and in particular, a motor that satisfies the specified conditions related to the performance of the motor and that corresponds to the specified function and standards information. Further, the amplifier selection unit 34 may select an amplifier that is capable of driving the motor satisfying the selection information and that corresponds to the function and standards information. In accordance with these features, it is possible for the operator to easily obtain, as a selection result, an amplifier corresponding to the desired auxiliary function and compliance standard.

Moreover, in the present exemplary modification, in the case that, among the function and standards information of the motor and the function and standards information of the amplifier, the former one is not included within the selection information, then in the same manner as in the embodiment, the motor selection unit 32 may select a motor that satisfies the conditions related to the performance included in the selection information.

In the same manner as in the embodiment, the selected motor, the selected amplifier, and the acquired (specified) function and standards information and explanatory text and the like may be displayed as selection results on the display unit 12. However, in the case of the present exemplary modification, since the operator should already be aware of the function and standards information because it is included in the selection information, the function and standards information need not necessarily be displayed.

[Inventions that can be Obtained from the Embodiment]

The inventions that can be grasped from the above-described embodiment and the modification thereof will be described below.

<First Invention>

The present invention is characterized by the selection device (10) that, when the operator inputs the selection information including the conditions related to the performance of the motor, selects a motor and an amplifier based on the selection information, the selection device comprising the storage unit (16) that stores the performance of the motor for each of the plurality of motors, and stores, for each of the plurality of motors and each of the plurality of amplifiers, function and standards information indicative of at least one of an auxiliary function or a compliance standard corresponding to each of the motors and each of the amplifiers, and the amplifier corresponding to the performance of the motor, the input unit (14) with which the operator inputs the selection information, the motor selection unit (32) which, by referring to the storage unit (16), selects the motor satisfying the conditions, the amplifier selection unit (34) which, by referring to the storage unit (16), selects the amplifier which is capable of driving the motor satisfying the conditions, the function and standards information acquisition unit (36) which, by referring to the storage unit (16), acquires the function and standards information corresponding to the selected motor and the selected amplifier, and the display unit (12) that displays the selected motor, the selected amplifier, and the acquired function and standards information.

In accordance with such features, the selection device (10) is provided, in which it is easy for the operator to select an amplifier while taking into consideration an auxiliary function and a compliance standard of the amplifier.

The selection information may further include the function and standards information of the motor, and the motor selection unit (32) may select the motor that satisfies the conditions and corresponds to the function and standards information in the selection information. In accordance with these features, it is possible for the operator to easily obtain, as a selection result, a motor corresponding to the desired auxiliary function and compliance standard.

The selection information may further include the function and standards information of the amplifier, and the amplifier selection unit (34) may select the amplifier that is capable of driving the motor satisfying the conditions and that corresponds to the function and standards information in the selection information. In accordance with these features, it is possible for the operator to easily obtain, as a selection result, an amplifier corresponding to the desired auxiliary function and compliance standard.

The storage unit (16) may further store text and drawings that describe the function and standards information, and the display unit (12) may further display the text and the drawings corresponding to the function and standards information that is displayed. In accordance with these features, for example, even if the operator does not know how to use the auxiliary functions or does not know the outline of the standards, the operator can easily grasp the content thereof.

The auxiliary function may include at least one of failure detection, predictive maintenance, a power saving function, high performance, or a safety function with respect to the motor and the amplifier. In accordance with this feature, it is possible for the operator to easily grasp whether or not the amplifiers are equipped with, as the auxiliary function, at least one of the failure detection, the predictive maintenance, the power saving function, the high performance, or the safety function.

<Second Invention>

The present invention is characterized by the selection device (10) that, when the operator inputs the selection information, selects a motor and an amplifier based on the selection information, the selection information including the conditions related to the performance of the motor, and function and standards information indicative of at least one of the auxiliary function or the compliance standard of the motor and the amplifier, the selection device comprising the storage unit (16) that stores the performance of the motor for each of the plurality of motors, and stores, for each of the plurality of motors and each of the plurality of amplifiers, the function and standards information corresponding to each of the motors and each of the amplifiers, and the amplifier corresponding to the performance of the motor, the input unit (14) with which the operator inputs the selection information, the motor selection unit (32) which, by referring to the storage unit (16), selects the motor satisfying the selection information, the amplifier selection unit (34) which, by referring to the storage unit (16), selects the amplifier which is capable of driving the motor satisfying the selection information and which corresponds to the function and standards information, and the display unit (12) that displays the selected motor and the selected amplifier.

In accordance with such features, the selection device (10) is provided, in which it is easy for the operator to select an amplifier while taking into consideration an auxiliary function and a compliance standard of the amplifier.

<Third Invention>

The present invention is characterized by the selection method for selecting a motor and an amplifier based on the selection information including the conditions related to the performance of the motor, the selection method comprising the storage step of storing the performance of the motor for each of the plurality of motors, and storing, for each of the plurality of motors and each of the plurality of amplifiers, function and standards information indicative of at least one of an auxiliary function or a compliance standard corresponding to each of the motors and each of the amplifiers, and the amplifier corresponding to the performance of the motor, the input step of inputting the selection information by the operator, the motor selection step of selecting, based on the information stored in the storage step, the motor satisfying the conditions, the amplifier selection step of selecting, based on the information stored in the storage step, the amplifier which is capable of driving the motor satisfying the conditions, the function and standards information acquisition step of acquiring, based on the information stored in the storage step, the function and standards information corresponding to the selected motor and the selected amplifier, and the display step of displaying the selected motor, the selected amplifier, and the acquired function and standards information.

In accordance with such features, the selection method is provided, in which it is easy for the operator to select an amplifier while taking into consideration an auxiliary function and a compliance standard of the amplifier.

The selection information may further include the function and standards information of the motor, and in the motor selection step, the motor that satisfies the conditions and corresponds to the input function and standards information may be selected. In accordance with these features, it is possible for the operator to easily obtain, as a selection result, a motor corresponding to the desired auxiliary function and compliance standard.

The selection information may further include the function and standards information of the amplifier, and in the amplifier selection step, the amplifier which is capable of driving the motor satisfying the conditions and which corresponds to the input function and standards information may be selected. In accordance with these features, it is possible for the operator to easily obtain, as a selection result, an amplifier corresponding to the desired auxiliary function and compliance standard.

In the storage step, text and drawings that describe the function and standards information may further be stored, and in the display step, the text and the drawings corresponding to the function and standards information that is displayed may further be displayed. In accordance with these features, for example, even if the operator does not know how to use the auxiliary functions or does not know the outline of the standards, the operator can easily grasp the content thereof.

The auxiliary function may include at least one of failure detection, predictive maintenance, a power saving function, high performance, or a safety function with respect to the motor and the amplifier. In accordance with this feature, it is possible for the operator to easily grasp whether or not the amplifiers are equipped with, as the auxiliary function, at least one of the failure detection, the predictive maintenance, the power saving function, the high performance, or the safety function.

The invention claimed is:

1. A selection device that, when an operator inputs selection information including conditions related to performance of a motor, selects the motor and an amplifier based on the selection information, the selection device comprising:
   a storage unit configured to store the performance of the motor for each of a plurality of the motors, and store, for each of the plurality of motors and each of a plurality of the amplifiers, function and standards information indicative of at least one of an auxiliary function or a compliance standard corresponding to each of the motors and each of the amplifiers, and the amplifier corresponding to the performance of the motor;
   an input unit with which the operator inputs the selection information;
   a motor selection unit configured to, by referring to the storage unit, select the motor satisfying the conditions;
   an amplifier selection unit configured to, by referring to the storage unit, select the amplifier configured to drive the motor satisfying the conditions;
   a function and standards information acquisition unit configured to, by referring to the storage unit, acquire the function and standards information corresponding to the selected motor and the selected amplifier; and
   a display unit configured to display the selected motor, the selected amplifier, and the acquired function and standards information, wherein the auxiliary function includes at least one of predictive maintenance, a power saving function, or high performance with respect to the motor and the amplifier.

2. The selection device according to claim 1, wherein:
the selection information further includes the function and standards information of the motor; and
the motor selection unit selects the motor that satisfies the conditions and corresponds to the function and standards information in the selection information.

3. The selection method according to claim 1, wherein:
the selection information further includes the function and standards information of the amplifier; and
the amplifier selection unit selects the amplifier that is configured to drive the motor satisfying the conditions and that corresponds to the function and standards information in the selection information.

4. The selection device according to claim 1, wherein:
the storage unit further stores text and a drawing configured to describe the function and standards information; and
the display unit further displays the text and the drawing corresponding to the function and standards information that is displayed.

5. The selection device according to claim 1, wherein the auxiliary function further includes at least one of failure detection or a safety function with respect to the motor and the amplifier.

6. A selection device that, when an operator inputs selection information, selects a motor and an amplifier based on the selection information, the selection information including conditions related to performance of the motor, and function and standards information indicative of at least one of an auxiliary function or a compliance standard of the motor and the amplifier, the selection device comprising:
a storage unit configured to store the performance of the motor for each of a plurality of the motors, and store, for each of the plurality of motors and each of a plurality of the amplifiers, the function and standards information corresponding to each of the motors and each of the amplifiers, and the amplifier corresponding to the performance of the motor;
an input unit with which the operator inputs the selection information;
a motor selection unit configured to, by referring to the storage unit, select the motor satisfying the selection information;
an amplifier selection unit configured to, by referring to the storage unit, select the amplifier that is configured to drive the motor satisfying the selection information and that corresponds to the function and standards information; and
a display unit configured to display the selected motor and the selected amplifier,
wherein the auxiliary function includes at least one of predictive maintenance, a power saving function, or high performance with respect to the motor and the amplifier.

7. A selection method for selecting a motor and an amplifier based on selection information including conditions related to performance of the motor, the selection method comprising:
a storage step of storing the performance of the motor for each of a plurality of the motors, and storing, for each of the plurality of motors and each of a plurality of the amplifiers, function and standards information indicative of at least one of an auxiliary function or a compliance standard corresponding to each of the motors and each of the amplifiers, and the amplifier corresponding to the performance of the motor;
an input step of inputting the selection information by an operator;
a motor selection step of selecting, based on the information stored in the storage step, the motor satisfying the conditions;
an amplifier selection step of selecting, based on the information stored in the storage step, the amplifier configured to drive the motor satisfying the conditions;
a function and standards information acquisition step of acquiring, based on the information stored in the storage step, the function and standards information corresponding to the selected motor and the selected amplifier; and
a display step of displaying the selected motor, the selected amplifier, and the acquired function and standards information,
wherein the auxiliary function includes at least one of predictive maintenance, a power saving function, or high performance with respect to the motor and the amplifier.

8. The selection method according to claim 7, wherein:
the selection information further includes the function and standards information of the motor; and
in the motor selection step, the motor that satisfies the conditions and corresponds to the input function and standards information is selected.

9. The selection method according to claim 7, wherein:
the selection information further includes the function and standards information of the amplifier; and
in the amplifier selection step, the amplifier that is configured to drive the motor satisfying the conditions and that corresponds to the input function and standards information is selected.

10. The selection method according to claim 7, wherein:
in the storage step, text and a drawing configured to describe the function and standards information are further stored; and
in the display step, the text and the drawing corresponding to the function and standards information that is displayed are further displayed.

11. The selection method according to claim 7 wherein the auxiliary function further includes at least one of failure detection or a safety function with respect to the motor and the amplifier.

* * * * *